US011305589B2

(12) United States Patent
Sueishi (10) Patent No.: US 11,305,589 B2
(45) Date of Patent: Apr. 19, 2022

(54) MOTORCYCLE TIRE FOR TRAVELING ON ROUGH TERRAIN

(71) Applicant: SUMITOMO RUBBER INDUSTRIES, LTD., Hyogo (JP)

(72) Inventor: Makoto Sueishi, Hyogo (JP)

(73) Assignee: SUMITOMO RUBBER INDUSTRIES, LTD., Hyogo (JP)

( * ) Notice: Subject to any disclaimer, the term of this patent is extended or adjusted under 35 U.S.C. 154(b) by 518 days.

(21) Appl. No.: 16/207,708

(22) Filed: Dec. 3, 2018

(65) Prior Publication Data

US 2019/0184758 A1     Jun. 20, 2019

(30) Foreign Application Priority Data

Dec. 19, 2017    (JP) .............................. JP2017-242953

(51) Int. Cl.
*B60C 11/11* (2006.01)
*B60C 11/01* (2006.01)
(Continued)

(52) U.S. Cl.
CPC .............. *B60C 11/11* (2013.01); *B60C 11/01* (2013.01); *B60C 11/0306* (2013.01); *B60C 11/0332* (2013.01); *B60C 11/1204* (2013.01); *B60C 11/1281* (2013.01); *B60C 11/1376* (2013.01); *B60C 2011/0334* (2013.01); (Continued)

(58) Field of Classification Search
CPC ..... B60C 11/11; B60C 11/01; B60C 11/0306; B60C 11/0332; B60C 11/1281; B60C 11/1376; B60C 11/1236; B60C 11/1204; B60C 2011/0334; B60C 2011/1227; B60C 2011/1286; B60C 2200/10; B60C 2200/14
See application file for complete search history.

(56) References Cited

U.S. PATENT DOCUMENTS

D826,843 S  *  8/2018  Shirakami ..................... D12/571
2017/0341471 A1 * 11/2017  Yurjevich ........... B60C 11/0306

FOREIGN PATENT DOCUMENTS

EP     2251213 A1    11/2010
EP     3323641 A1     5/2018
(Continued)

OTHER PUBLICATIONS

European Search Report, European Patent Office, Patent Application No. 18208902.9, dated May 21, 2019.

*Primary Examiner* — Steven D Maki
*Assistant Examiner* — Philip N Schwartz
(74) *Attorney, Agent, or Firm* — Greenblum & Bernstein, P.L.C.

(57) ABSTRACT

A motorcycle tyre for traveling on rough terrain, the tyre includes a tread portion provided with blocks. The at least one of the blocks includes a ground contact surface having a pair of lateral edges extending in a tyre axial direction. The at least one of the blocks is provided with a pair of lateral narrow grooves extending in the tyre axial direction on the ground contact surface to form a pair of edge-side portions defined between the pair of lateral narrow grooves and the pair of lateral edges. The at least one of the pair of edge-side portions includes a neck portion having a minimum circumferential length thereof, wherein a circumferential length of the at least one of the pair of edge-side portions increases toward axially both sides from the neck portion.

14 Claims, 10 Drawing Sheets

(51) Int. Cl.
*B60C 11/03* (2006.01)
*B60C 11/12* (2006.01)
*B60C 11/13* (2006.01)

(52) U.S. Cl.
CPC ............ *B60C 2011/1227* (2013.01); *B60C 2011/1286* (2013.01); *B60C 2200/10* (2013.01); *B60C 2200/14* (2013.01)

(56) References Cited

FOREIGN PATENT DOCUMENTS

| | | |
|---|---|---|
| JP | 2012-30615 | 2/2012 |
| WO | 2016089501 A1 | 6/2016 |

* cited by examiner

Tread edge side​    Tire equator side

Tread edge side         Tire equator side

FIG.10

Comparative Example

MOTORCYCLE TIRE FOR TRAVELING ON ROUGH TERRAIN

BACKGROUND ART

Field of the Invention

The present invention relates to motorcycle tyres for traveling on rough terrain, and more particularly to a tyre having a block pattern.

Description of the Related Art

The following Patent document 1 discloses a motorcycle tyre for traveling on rough terrain which includes tread blocks provided with sipes on the ground contact surfaces in order to improve grip performance.

Unfortunately, as to the blocks provided with sipes, there has been a problem that damage tends to occur on both sides of laterally extending edges of the ground contact surfaces.
[Patent Document 1]

Japanese Unexamined Patent Application Publication 2012-30615

SUMMARY OF THE DISCLOSURE

In view of the above problem in the conventional art, the present disclosure has an object to provide motorcycle tyres for traveling on rough terrain which can improve grip performance while ensuring the durability of one or more blocks.

According to one aspect of the disclosure, a motorcycle tyre for traveling on rough terrain, the tyre includes a tread portion being provided with blocks. The at least one of the blocks includes a ground contact surface having a pair of lateral edges extending in a tyre axial direction. The at least one of the blocks is provided with a pair of lateral narrow grooves extending in the tyre axial direction on the ground contact surface to form a pair of edge-side portions defined between the pair of lateral narrow grooves and the pair of lateral edges. The at least one of the pair of edge-side portions includes a neck portion having a minimum circumferential length thereof, wherein a circumferential length of the at least one of the pair of edge-side portions increases toward axially both sides from the neck portion.

In another aspect of the disclosure, the pair of edge-side portions each may have the neck portion, and each circumferential length of the pair of edge-side portions may increase axially both sides thereof from the neck portion.

In another aspect of the disclosure, the pair of lateral edges may extend in a straight shape.

In another aspect of the disclosure, an average circumferential length of the at least one of the pair of edge-side portions represented by a ratio of a ground contact surface area of the at least one of the pair of edge-side portions to an axial maximum length of the at least one of the pair of edge-side portions may be in a range of from 0.15 to 0.35 times a circumferential maximum length of the at least one of the blocks.

In another aspect of the disclosure, the ground contact surface may have a pair of longitudinal edges connecting the pair of lateral edges, the pair of lateral narrow grooves may extend from one of the pair of longitudinal edges and terminating at inner ends thereof located within the ground contact surface, and the ground contact surface may be provided with a longitudinal narrow groove connecting the inner ends of the pair of lateral narrow grooves.

In another aspect of the disclosure, the at least one of the blocks may be arranged between a tyre equator and a tread edge, and the pair of lateral narrow grooves may extend from one of the pair of longitudinal edges located on the tread edge side.

In another aspect of the disclosure, the at least one of the blocks may include an inner portion surrounded by the pair of lateral narrow grooves and the longitudinal narrow groove, the inner portion may include a wide portion having a circumferential maximum length, and a circumferential length of the inner portion may decrease toward axially both sides from the wide portion.

In another aspect of the disclosure, an axial maximum length of the inner portion may be equal to or more than 0.60 times a block average axial length represented by a ratio of a ground contact surface area of the at least one of the blocks to a circumferential maximum length of the at least one of the blocks.

In another aspect of the disclosure, the tread portion, on each side of the tyre equator, may include a tread middle region between a first circumferential line located away from a tyre equator at a distance of 25% of a tread development half-width and a second circumferential line located away from the tyre equator at a distance of 75% of the tread development half-width, and the at least one of the blocks may be arranged such that a center of figure of the ground contact surface is located within the tread middle region.

In another aspect of the disclosure, the at least one of the blocks may be provided with a pair of longitudinal narrow grooves connecting the pair of lateral narrow grooves to form a closed annular narrow groove.

DESCRIPTION OF THE PREFERRED EMBODIMENTS

An embodiment of the present invention will be explained below with reference to the accompanying drawings.

Figure 1:
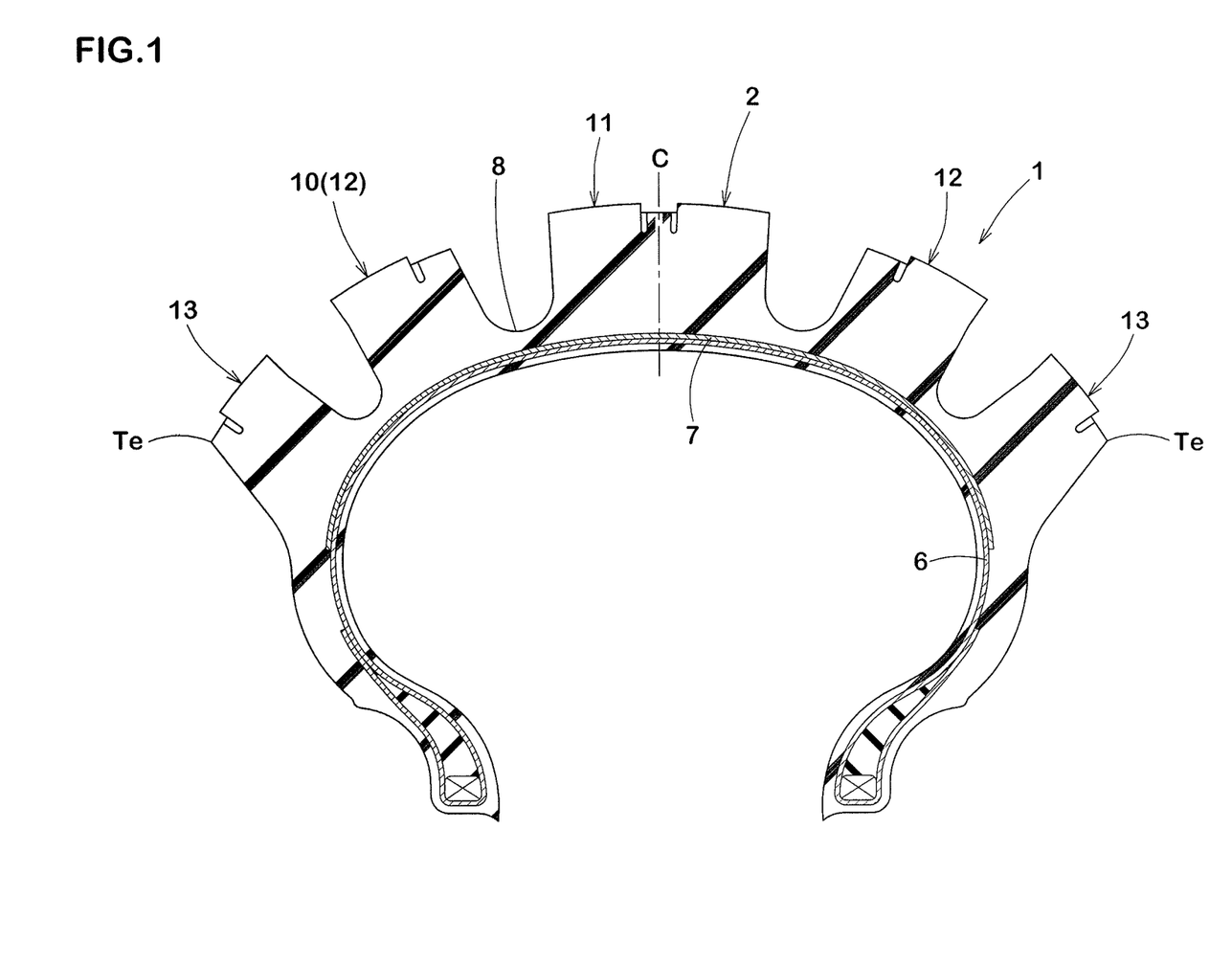
FIG. 1 is a cross-sectional view of a motorcycle tyre for traveling on rough terrain according to one aspect of the disclosure.
Figure 2:
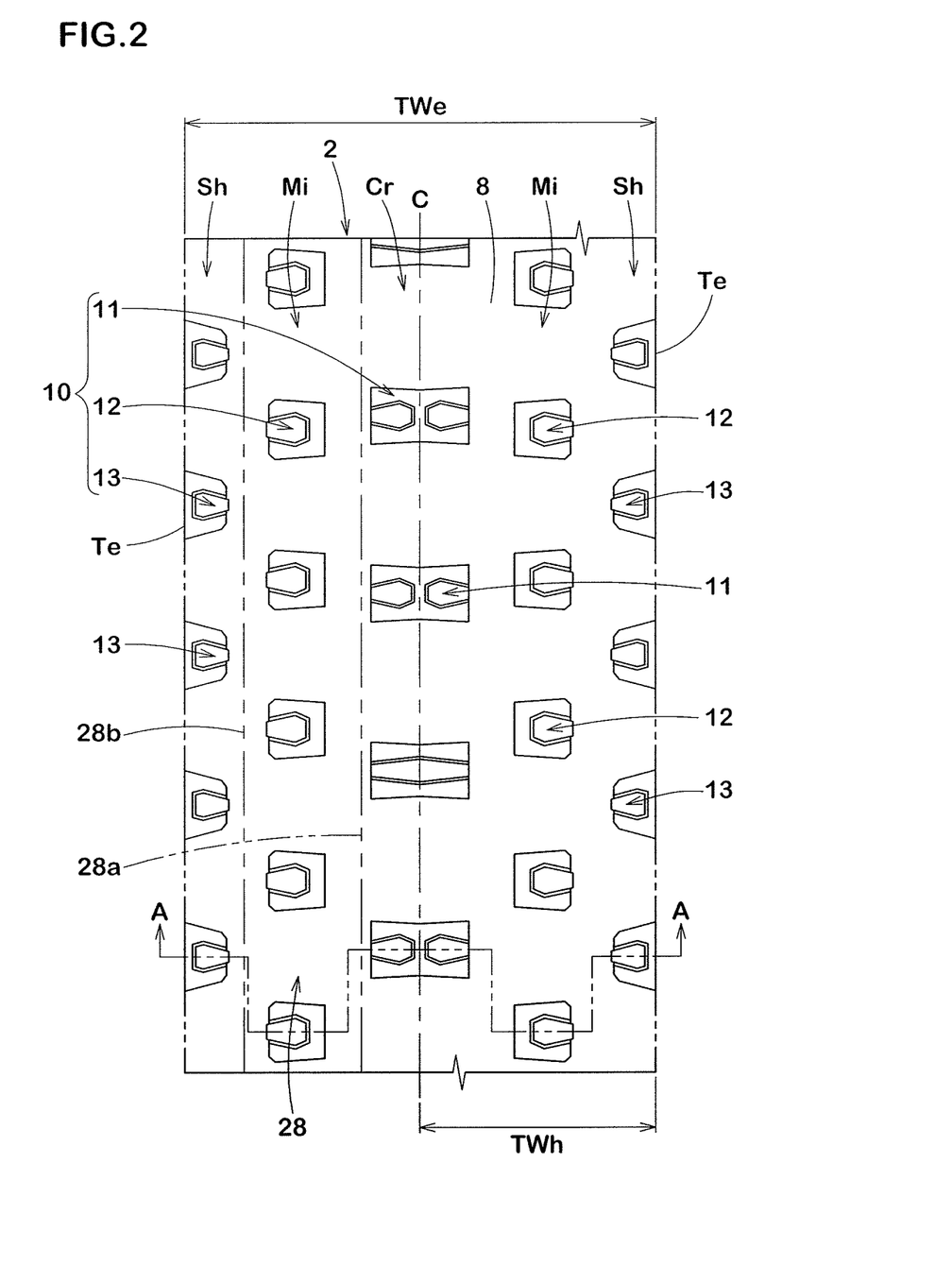
FIG. 2 is a development view of a tread portion in FIG. 1.

FIG. 1 is a cross-sectional view of a motorcycle tyre for traveling on rough terrain (hereinafter, simply referred to as "tyre") 1 under a standard state according to one aspect of the disclosure. FIG. 2 is a development view of a tread portion 2 of the tyre 1, and FIG. 1 is a cross-section taken along line A-A of FIG. 2.

As used herein, the standard state is such that the tyre 1 is mounted on a standard wheel rim (not illustrated) with a standard pressure but is loaded with no tyre load. Unless otherwise noted, dimensions of respective portions of the tyre 1 are values measured under the standard state.

As used herein, the standard wheel rim is a wheel rim officially approved for each tyre by standards organizations on which the tyre 1 is based, wherein the standard wheel rim is the "standard rim" specified in JATMA, the "Design Rim" in TRA, and the "Measuring Rim" in ETRTO, for example.

As used herein, the standard pressure is a standard pressure officially approved for each tyre by standards organizations on which the tyre 1 is based, wherein the standard pressure is the "maximum air pressure" in JATMA, the maximum pressure given in the "tire Load Limits at Various Cold Inflation Pressures" table in TRA, and the "Inflation Pressure" in ETRTO, for example.

As illustrated in FIG. 1, the tyre 1 according to the embodiment, for example, is used for motocross. Thus, an outer surface of the tread portion 2, in a cross-section, is curved in an arc-shaped manner to protrude radially outwardly.

The tyre 1 according to the embodiment, for example, includes a carcass 6 and a belt layer 7 which may be used appropriate conventional structures.

The tread portion 2 is configured as a block pattern having blocks 10 each of which protrudes radially outwardly from a tread bottom surface 8.

The blocks 10, for example, include crown blocks 11, middle blocks 12 and shoulder blocks 13. The center of figures of the crown blocks 11, the middle blocks 12 and the shoulder blocks 13 are respectively located within a crown region Cr, middle regions Mi and shoulder regions Sh.

As illustrated in FIG. 2, the crown region Cr is a region centered on the tyre equator C and has a ⅓ width of the tread development width TWe.

The shoulder regions Sh are regions each having a ⅙ width of the tread development width TWe from the respective tread edges Te toward the tyre equator C.

The middle regions Mi are regions between the crown region Cr and a respective one of the shoulder regions Sh.

As used herein, the tread development width TWe is a distance between the tread edges Te when the tread portion 2 is developed on a plane. As used herein, the tread edges Te are axially outermost edges of the ground contact surfaces of the axially outermost blocks 10 provided on the tread portion 2 on each side of the tyre equator C.

In this embodiment, the tread portion 2, for example, includes a row of the crown blocks 11 arranged on the tyre equator C, a pair of rows of the middle blocks 12 arranged axially both sides of the row of the crown blocks 11, and a pair of rows of the shoulder blocks 13 arranged axially both sides of the pair of rows of the middle blocks 12.

Figure 3:
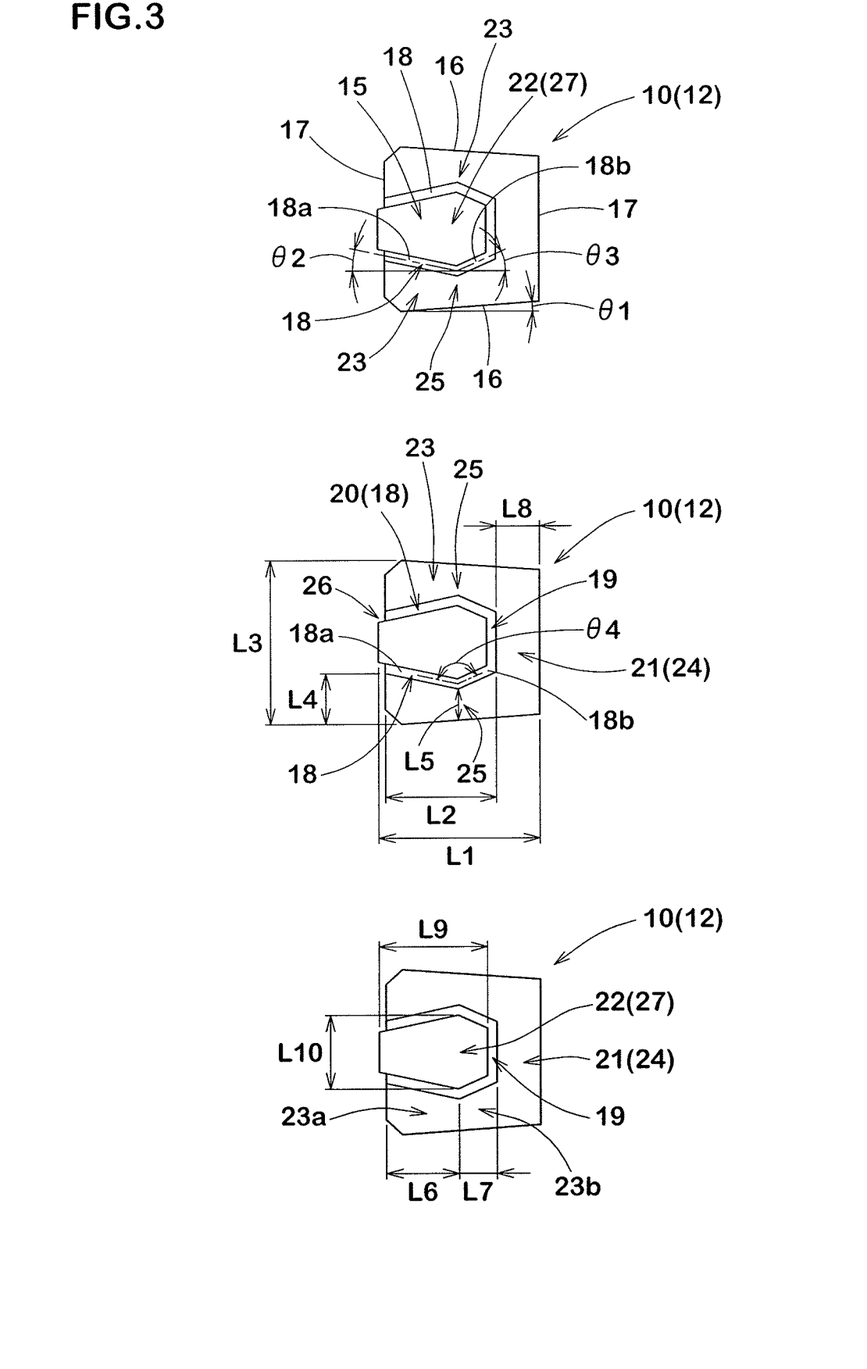
FIG. 3 is an enlarged view of a set of some middle blocks of FIG. 2.

FIG. 3 illustrates an enlarged view of a set of some middle blocks 12 of FIG. 2 for explaining an aspect of the blocks 10. In FIG. 3, the right side and the left side respectively correspond to the tyre equator C side and the corresponding tread edge Te side. As illustrated in FIG. 3, at least one of the blocks 10 (e.g., preferably, all middle blocks 12) includes a ground contact surface 15 having a pair of lateral edges 16 extending in the tyre axial direction and a pair of circumferential edges 17 extending in the tyre circumferential direction, a pair of lateral narrow grooves 18 extending in the tyre axial direction on the ground contact surface 15, and a pair of edge-side portions 23 defined between the lateral edges 16 and the lateral narrow grooves 18. The lateral narrow grooves 18 and the edge-side portions 23 may increase edge lengths of the block 10, improving grip performance.

At least one of the pair of edge-side portions 23 includes a neck portion 25 having a minimum circumferential length thereof, and a circumferential length of the edge-side portion 23 increases toward axially both sides from the neck portion 25. In this embodiment, each of the pair of edge-side portions 23 is configured to include the neck portion 25 and a circumferential length of the edge-side portion 23 increases toward axially both sides from the neck portion 25.

In the edge-side portions 23 as mentioned above, since rigidity thereof can be enhanced from the neck portion 25 toward axially both sides, excessive deformation on axially both end portions of the lateral edges 16 can be suppressed, resulting in suppressing damage at the axially both end portions of the lateral edges 16.

Preferably, the lateral edges 16, for example, extend in a straight shape. In this embodiment, the lateral edges 16, for example, are inclined at angles θ1 with respect to the tyre axial direction. Preferably, the angles θ1 are equal to or less than 10 degrees.

Preferably, the lateral edges 16, for example, are inclined in an opposite direction from each other. In this embodiment, the lateral edges 16 are inclined in directions such that the lateral edges 16 approach each other toward the tyre equator C. Thus, a circumferential length of the ground contact surface 15 decreases toward the tyre equator C. Such a block 10 having the ground contact surface 15, on mud terrain traveling, can help to improve turning performance by generating a counterforce toward the tyre axial direction when pushing mud away in the tyre circumferential direction.

In this embodiment, the ground contact surface 15 is provided with the pair of lateral narrow grooves 18 and a longitudinal narrow groove 19 connecting the pair of lateral narrow grooves 18, thus forming a continuous single narrow groove 20.

The pair of lateral narrow grooves 18 extends from one of the pair of circumferential edges 17 and terminating at inner ends located within the ground contact surface 15. In this embodiment, the pair of lateral narrow grooves 18, for example, extends from the circumferential edge 17 that is located on the tread edge Te side.

Preferably, each lateral narrow groove 18 is bent or curved to protrude the adjacent lateral edge 16. In this embodiment, each lateral narrow groove 18, for example, includes a straightly extending first inclined element 18a and a straightly extending second inclined element 18b which are connected to form a bent shape. The first inclined element 18a, for example, extends from the circumferential edge 17 on the tread edge Te side toward the tyre equator C to approach the adjacent lateral edge 16. The second inclined element 18b, for example, is inclined in an opposite direction to the first inclined element 18a and terminates within the block 10. The lateral narrow grooves 18 as mentioned above improve contacting property of the block 10 to the ground by softening ill the rigidity of the block 10 appropriately, resulting in improving grip performance.

Preferably, the first inclined element 18a, for example, is inclined at an angle θ2 in a range of from 5 to 20 degrees with respect to the tyre axial direction. Preferably, an angle θ3 of the second inclined element 18b with respect to the tyre axial direction, for example, is greater than the angle θ2 of the first inclined element 18a. Preferably, the angle θ3 of the second inclined element 18b, for example, is in a range of from 15 to 30 degrees. Preferably, an angle θ4 between the first inclined element 18a and the second inclined element 18b, for example, is in a range of from 140 to 150 degrees. The lateral narrow grooves 18 as mentioned above can improve grip performance when straight traveling as well as when cornering in a well-balanced manner.

Preferably, the first inclined element 18a and the second inclined element 18b are different in axial length. In this embodiment, the second inclined element 18b has a shorter axial length than the first inclined element 18a.

The longitudinal narrow groove 19, for example, connects the inner ends of pair of lateral narrow grooves 18. In this embodiment, the longitudinal narrow groove 19, for example, extends in a straight shape. In some preferred embodiments, the longitudinal narrow groove 19 extends in parallel with the circumferential edges 17 of the ground contact surface 15.

Figure 4A:
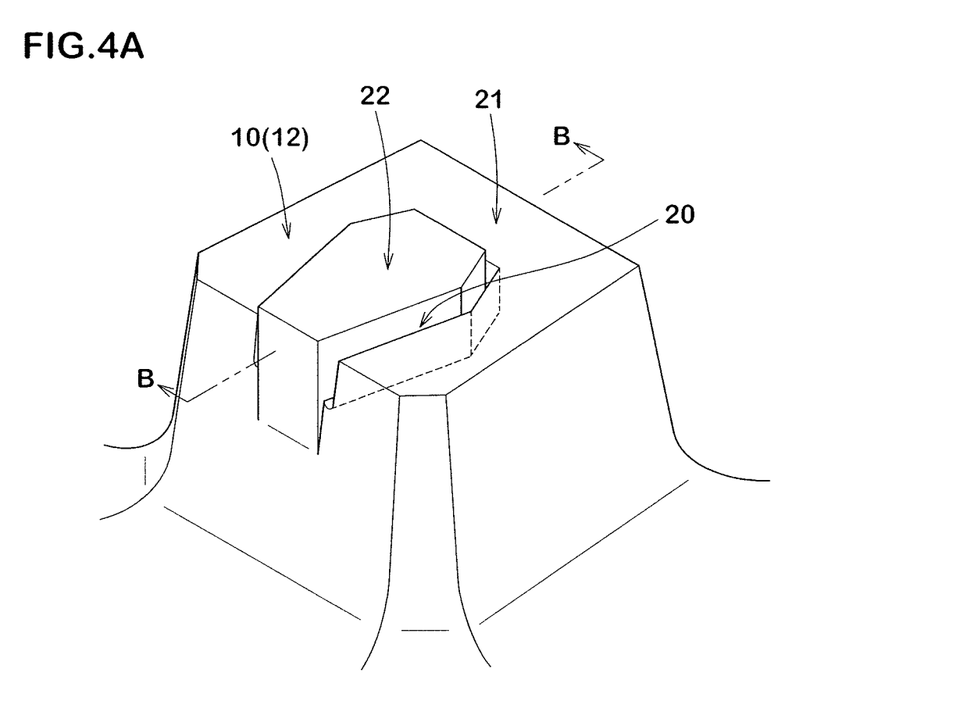
FIG. 4A is a perspective view of one middle block.
Figure 4B:
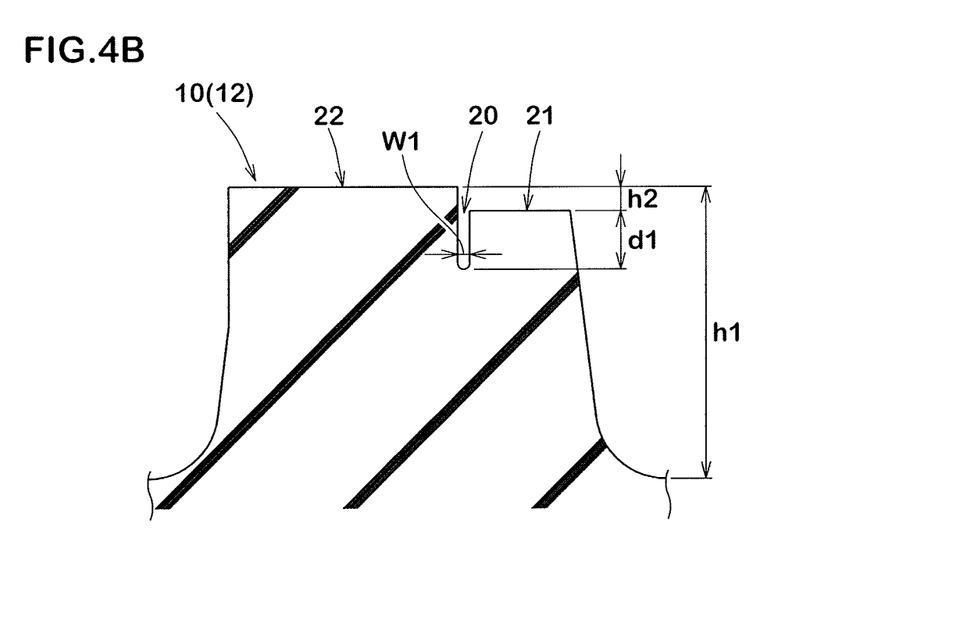
FIG. 4B is a cross-sectional view taken along line B-B of FIG. 4A.

FIG. 4A illustrates an enlarged perspective view of the block 10, and FIG. 4B illustrates a cross-sectional view taken along line B-B of FIG. 4A. As illustrated in FIG. 4B, the narrow groove 20, for example, has a groove width W1 of from 0.5 to 3.0 mm. Preferably, the narrow groove 20 has a depth d1 less than 20% of a block height h1 of the block 10.

As illustrated in FIG. 3, by providing the above-mentioned narrow groove 20 on the ground contact surface 15, the block 10 is divided into an inner portion 22 and an outer portion 21. The inner portion 22 is surrounded by the narrow groove 20 which includes the pair of lateral narrow grooves 18 and the longitudinal narrow groove 19. The inner portion 22 includes a part of the circumferential edge 17 located on the tread edge Te side. The outer portion 21 is configured to surround the inner portion 22 through the narrow groove 20. The outer portion 21 includes the above-mentioned edge-side portions 23 and a connecting portion 24 located on the tyre equator C side to connect the edge-side portions 23.

In this embodiment, in each edge-side portion 23, for example, a circumferential length thereof increases gradually toward axially both sides from the neck portion 25. Thus, damage on axial both end portions of the lateral edges 16 can be prevented further.

The edge-side portions 23, for example, are configured as laterally long shapes having the axial lengths longer than the circumferential lengths. Preferably, axial maximum lengths L2 of the edge-side portions 23, for example, are in a range of from 0.65 to 0.80 times the axial maximum length L1 of the block 10. Note that dimensions of blocks shall mean dimensions on the ground contact surfaces unless otherwise noted.

Preferably, circumferential maximum lengths L4 of the edge-side portions 23 are in a range of from 0.25 to 0.40 times the circumferential maximum length L3 of the block 10. Preferably, the neck portion 25, for example, has a circumferential length L5 in a range of from 0.55 to 0.70 times the circumferential maximum lengths L4 of the edge-side portions 23.

In order to improve grip performance and block durability in a well-balanced manner, an average circumferential length of each edge-side portion 23 is preferably equal to or more than 0.15 times the circumferential maximum length L3 of the block 10, more preferably equal to or more than 0.20 times, but preferably equal to or less than 0.35 times, more preferably equal to or less than 0.30 times. Note that the average circumferential length of each edge-side portion 23 means a ratio of a ground contact surface area of the edge-side portion 23 to the axial maximum length L2 of the edge-side portion 23.

Each edge-side portion 23, for example, includes a first portion 23a between the first inclined element 18a and the corresponding lateral edge 16, and a second portion 23b between the second inclined element 18b and the corresponding lateral edge 16. Preferably, an axial length L6 of the first portion 23a is in a range of from 0.60 to 0.70 times the axial maximum length L2 of the edge-side portion 23. The second portion 23b, for example, has an axial length L7 smaller than that of the first portion 23a. Preferably, the axial length L7 of the second portion 23b, for example, in a range of from 0.45 to 0.60 times the axial length L6 of the first portion 23a. Each edge-side portion 23 as mentioned above can provide a sufficient axial distance from the neck portion 25 to an end portion of the lateral edge 16 located on the tread edge Te side, suppressing damage to be generated on the block at a situation on cornering with a maximum camber angle.

The connecting portion 24, for example, is configured as a longitudinally long shape having the circumferential length longer than the axial length. Preferably, the connecting portion 24, for example, has a constant axial length over the entire length in the tyre circumferential direction. Preferably, the axial length L8 of the connecting portion 24, for example, is greater than the circumferential length L5 of the neck portion 25. Preferably, the axial length L8 of the connecting portion 24, for example, is in a range of from 1.30 to 1.50 times the circumferential length L5 of the neck portion 25. Thus, the neck portion 25 can improve grip performance when straight traveling, and the connecting portion 24 with relatively high rigidity can help to offer linear feedback (response) to riders at cornering.

As illustrated in FIG. 4A, the inner portion 22 preferably protrudes radially outwardly from the outer portion 21. Thus, the ground contact surface of the inner portion 22 can scratch the ground forcefully, leading to high grip performance.

As illustrated in FIG. 4B, a protruding height h2 of the inner portion 22, for example, is preferably in a range of from 5% to 15% of a height h1 of the block 10. Note that the protruding height h2 is a height between the ground contact surfaces of the outer portion 21 and the inner portion 22 in the block height direction.

As illustrated in FIG. 3, the inner portion 22, for example, is configured as a laterally long shape having the axial length longer than the circumferential length. In this embodiment, the inner portion 22, for example, has a hexagonal shaped ground contact surface.

The inner portion 22 has an axial maximum length L9 is preferably equal to or more than 0.60 times of a block average axial length, more preferably equal to or more than 0.65 times, but preferably equal to or less than 0.80 times, more preferably equal to or less than 0.75 times. Here, the block average axial length means a ratio of a ground contact surface area of the block 10 to the circumferential maximum length L3 of the block 10. This makes it possible to improve grip performance and the block durability in a well-balanced manner.

In some preferred embodiments, the inner portion 22 includes a protruding portion 26 extending beyond the circumferential edge 17 of the outer portion 21 located on the tread edge Te side to the tread edge Te side. The inner portion 22, when traveling in mud, can deform flexibly so as to remove mud stuck in the narrow groove 20 as well as around the block 10.

Preferably, the inner portion 22, for example, includes a wide portion 27 having a circumferential maximum length, and a circumferential length of the inner portion 22 decreases toward axially both sides from the wide portion 27. The inner portion 22 as mentioned above, when receiving a large ground contact pressure, can deform to contact with the outer portion 21 to enhance the apparent rigidity of the block, leading to better steering stability.

Preferably, a circumferential length L10 of the wide portion 27 of the inner portion 22, for example, is in a range of from 0.45 to 0.55 times the circumferential maximum length L3 of the block 10.

As illustrated in FIG. 2, the center of figure of the ground contact surface of the block 10 is preferably located within a tread middle region 28. Such a block can provide high grip in a wide range of the camber angle. Note that the tread middle region 28 is a region between a first circumferential line 28a located away from the tyre equator C at a distance of 25% of the tread development half-width TWh and a second circumferential line 28b located away from the tyre equator C at a distance of 75% of the tread development half-width TWh. The tread development half-width TWh is a distance from the tyre equator C to one of the tread edges Te measured along the outer surface of the tread portion 2, and which corresponds to the half length of the tread development width TWe.

Figure 5:
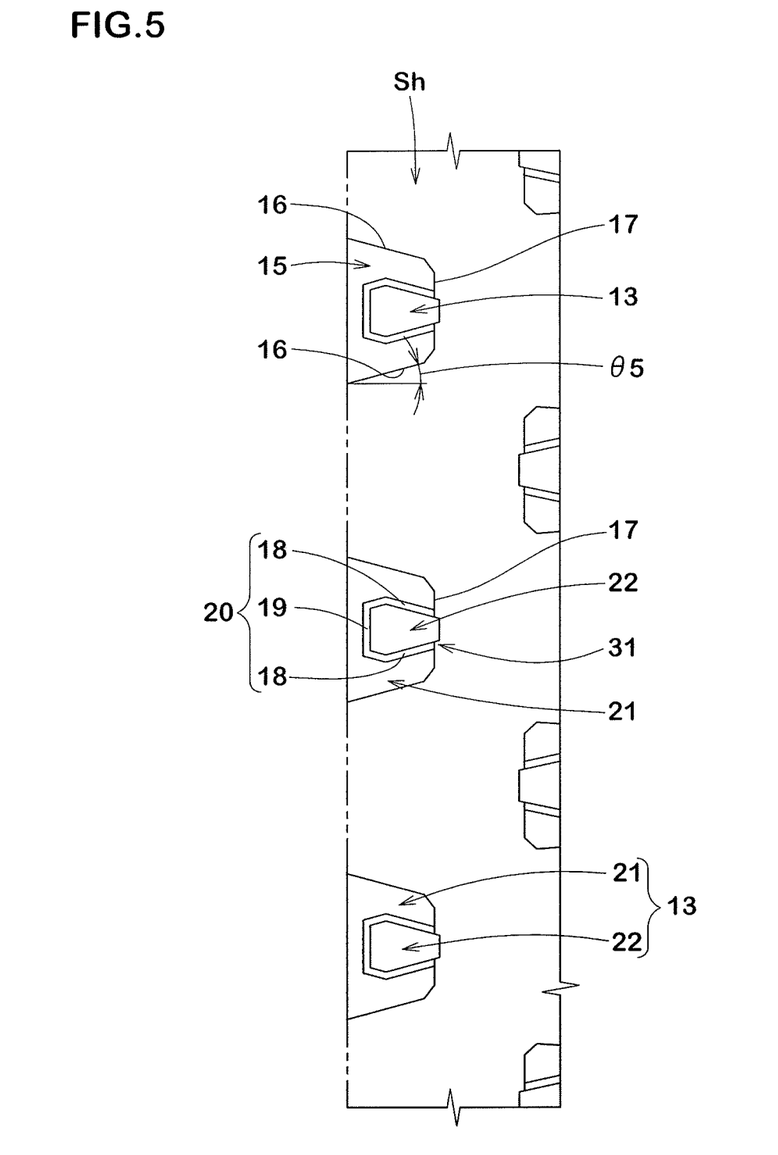
FIG. 5 is an enlarged view of a shoulder region of FIG. 2.

FIG. 5 illustrates an enlarged view of one of the shoulder regions Sh. As illustrated in FIG. 5, shoulder blocks 13 arranged in each shoulder region Sh, for example, are configured to have the same features of the above-mentioned middle blocks 12. Specifically, each shoulder block 13 includes the narrow groove 20 which includes the pair of lateral narrow grooves 18 and the longitudinal narrow groove 19, the inner portion 22 surrounded by the narrow groove 20, and the outer portion 21 surrounding the inner portion 22 through the narrow groove 20. In these elements of each shoulder block 13, the corresponding features of the middle blocks 12 are applied except the following points on difference.

Preferably, each shoulder block 13, for example, has a circumferential length which gradually decreases toward axially inwardly.

Preferably, in each shoulder block 13, the lateral edges 16 of the ground contact surface 15, for example, are inclined at an angle θ5 with respect to the tyre axial direction, and the angle θ5 is greater than that of the lateral edges 16 of each middle block 12. The angle θ5, for example, is preferably in a range of from 10 to 20 degrees. The shoulder blocks 13 as mentioned above can generate an axial counterforce together with the middle blocks 12, improving cornering performance further.

Preferably, in each shoulder blocks 13, the pair of lateral narrow grooves 18 of the narrow groove 20 extends from axially outwardly from the circumferential edge 17 located on the tyre equator C side, and terminates within the shoulder block 13. Thus, in each shoulder blocks 13, the inner portion 22 includes the protruding portion 31 protruding toward the tyre equator C. The shoulder blocks 13 as mentioned above, when traveling in mud, can deform flexibly so as to remove mud stuck in the narrow groove 20 together with the above-mentioned middle blocks 12.

Figure 6:
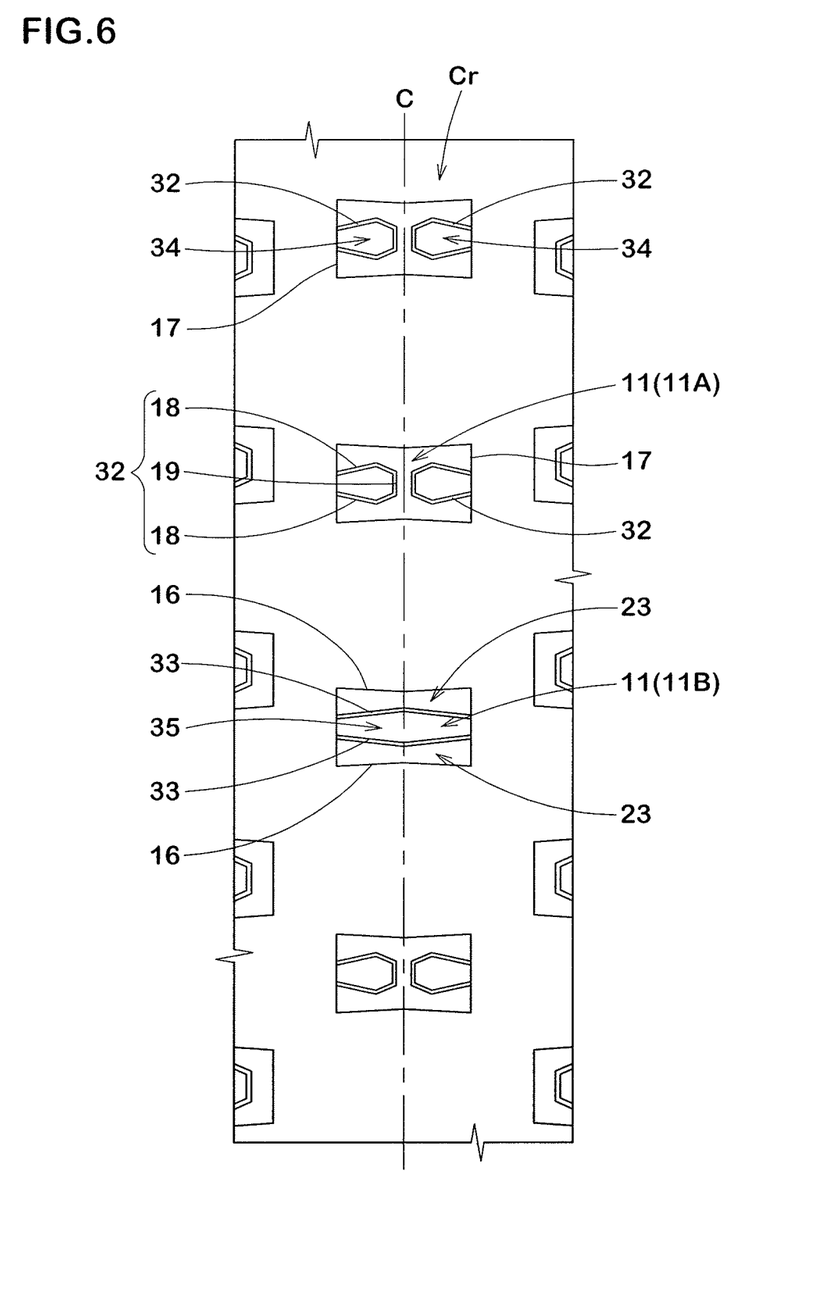
FIG. 6 is an enlarged view of a crown region of FIG. 2.

FIG. 6 illustrates an enlarged view of the crown region Cr. As illustrated in FIG. 6, the crown blocks 11 arranged in the crown region Cr, for example, is located on the tyre equator C. In this embodiment, the crown blocks 11 are located such that the center positions on the tyre axial direction are placed on the tyre equator C. Each crown blocks 11, for example, is preferably configured as a laterally long shape having the axial length longer than the circumferential length to improve traction performance.

In this embodiment, each crown block 11 preferably has the circumferential length which increases from the axial center location toward axially both sides, thereby generating powerful mud traction by pushing away the mud.

The crown blocks 11, for example, include one or more first crown blocks 11A and one or more second crown blocks 11B which are different from each other in arrangement of the narrow groove 20.

Each first crown block 11A, for example, is provided with two first crown narrow grooves 32 each of which includes the pair of lateral narrow grooves 18 extending from a respective one of the circumferential edges 17 and terminating within the block, and the longitudinal narrow groove 19 connecting the pair of lateral narrow grooves 18. In this embodiment, each first crown block 11A is provided with two first crown narrow grooves 32 such that one is on each side of the tyre equator C. Such first crown narrow grooves 32 can improve contacting property of the block to the ground.

Each first crown block 11A includes two crown block pieces 34 on the respective sides of the tyre equator C and which are surrounded by the first crown narrow grooves 32. As each crown block piece 34, the feature of the above-mentioned inner portion 22 can be applied.

Each second crown blocks 11B, for example, is provided with two second crown narrow grooves 33 traversing the block completely. Thus, each second crown block 11B includes a second crown block piece 35 defined between two second crown narrow grooves 33, and a pair of edge-side portions 23 located on circumferentially both sides of the second crown block piece 35. Such second crown blocks 11B can suppress damage on axially both end portions of the lateral edges 16 effectively.

As illustrated in FIG. 2, it is preferable that the tread portion 2, for example, has a land ratio of from 14% to 35% in order to improve grip performance and block durability in a well-balanced manner. As used herein, the land ratio shall mean a ratio Sb/Sa of a total ground contact surface area "Sa" of the blocks to a gross contact surface area "Sb" of a virtual tread portion in which all grooves are filled up.

In the same point of view, a tread rubber forming the tread portion 2 preferably has a rubber hardness of from 68 to 85 degrees, for example. As used herein, "rubber hardness" shall mean the durometer type-A hardness measured according to Japanese Industrial Standard JIS-K6253 at a temperature of 25 degrees C.

FIGS. 7A to 9B illustrate blocks 10 according to other embodiments of the disclosure. Note that the same or common elements in FIGS. 7A to 9B as the embodiment mentioned above are denoted with the same reference numerals and that the detail explanation thereof is omitted. Furthermore, the blocks 10 shown in FIGS. 7A to 9B, for example, are arranged between the tyre equator C and a respective one of tread edges Te, preferably in the tread middle regions 28. Accordingly, each block 10 includes the circumferential edge 17a located on the tread edge Te side and the circumferential edge 17b located on the tyre equator C side.

Figure 7A:
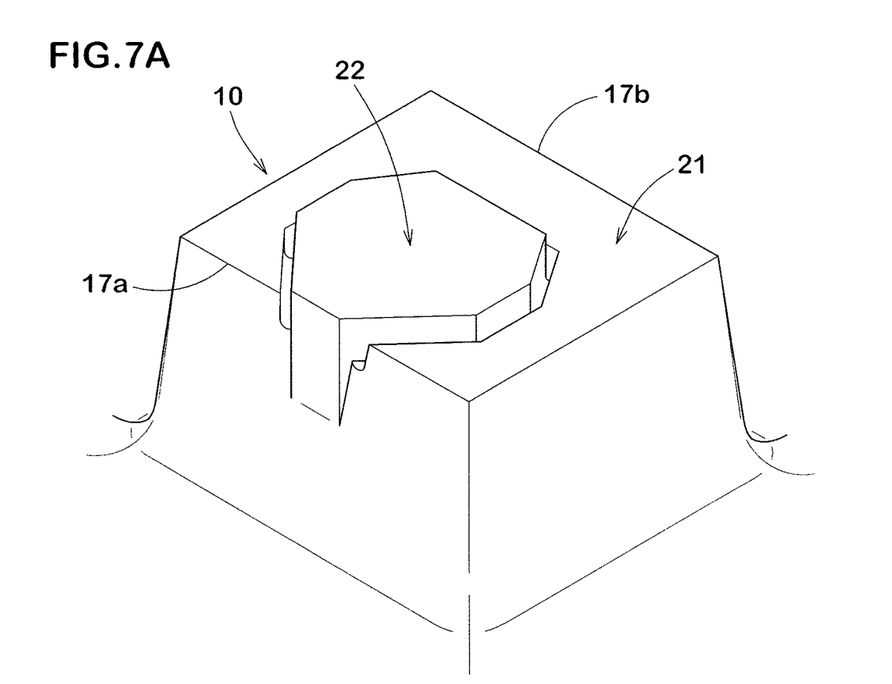
FIG. 7A is a perspective view of a block according to another embodiment of the disclosure.
Figure 7B:
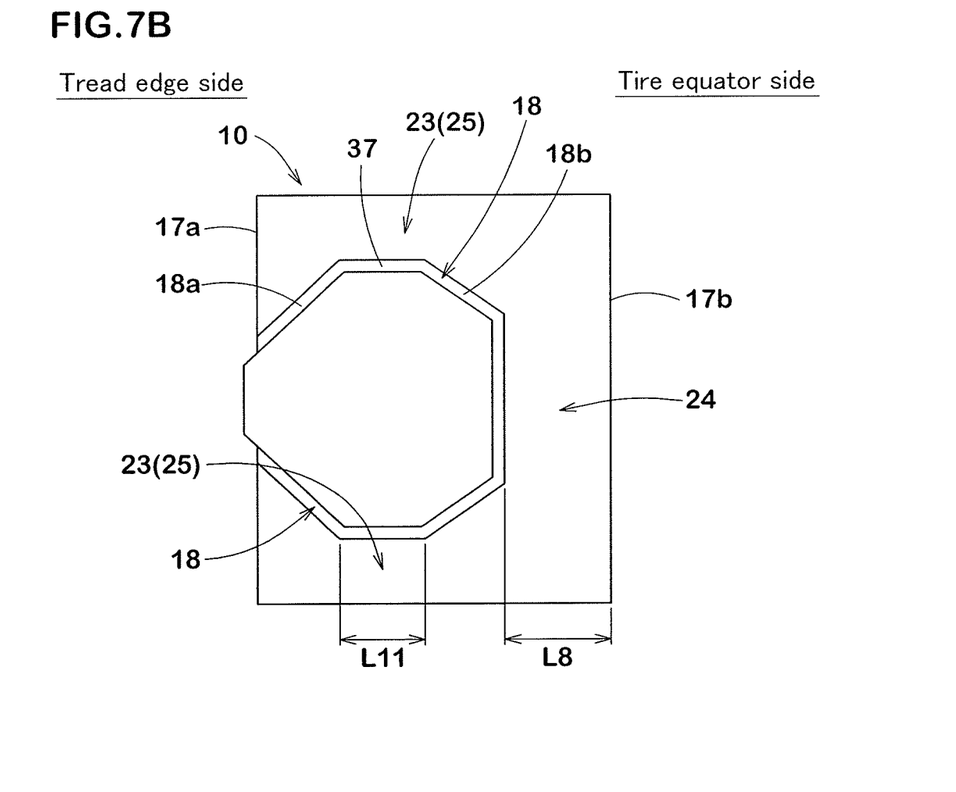
FIG. 7B is a plan view of FIG. 7A.

As illustrated in FIGS. 7A and 7B, each narrow lateral groove 18 includes the first inclined element 18a, the second inclined element 18b, and lateral element 37 extending therebetween along, e.g., parallel with, the tyre axial direction. Thus, each edge-side portion 23 includes a laterally long neck portion 25. Such blocks 10 can suppress damage on the neck portions 25, improving block durability further.

In this embodiment, an axial length L11 of each neck portion 25 is preferably smaller than the axial length L8 of the connecting portion 24. Specifically, the length L11 of the neck portion 25 is preferably in a range of from 0.75 to 0.85 times the axial length L8 of connecting portion 24 to improve block durability while offering linear feedback (response) to riders at cornering.

Figure 8A:
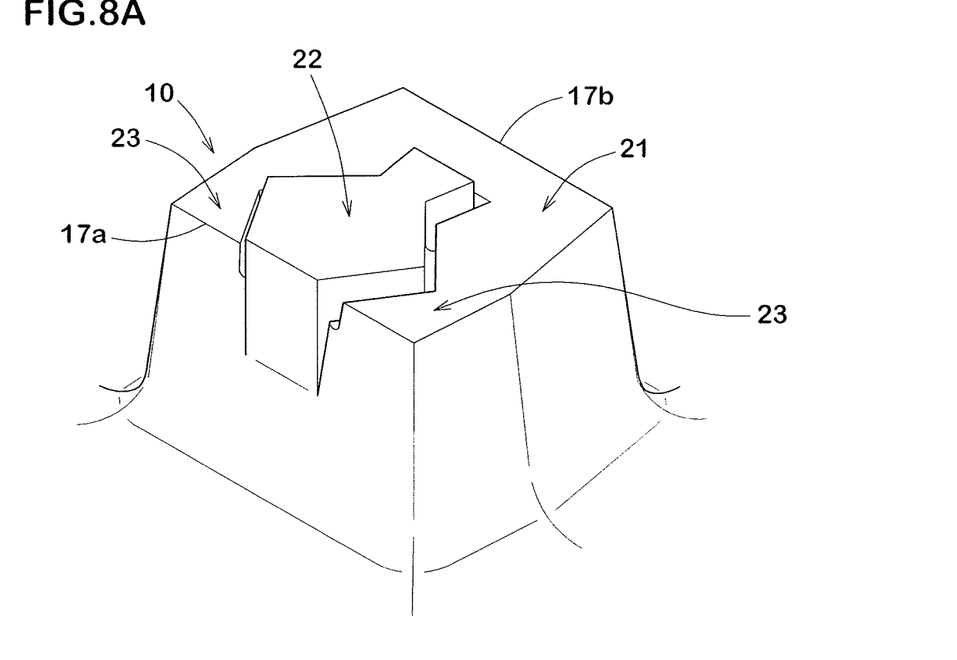
FIG. 8A is a perspective view of a block according to yet another embodiment of the disclosure.
Figure 8B:
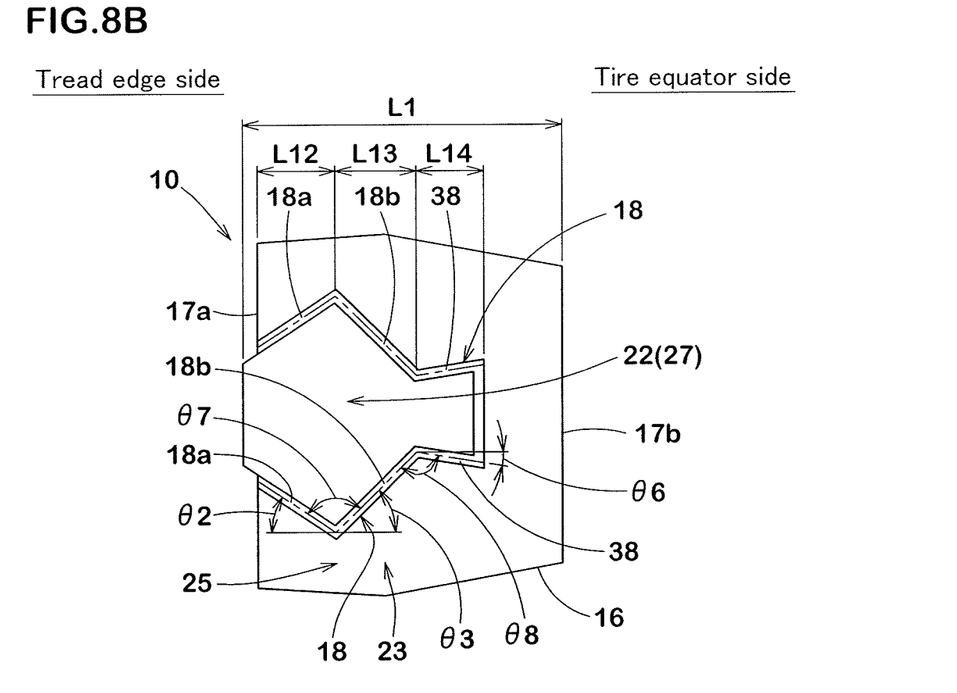
FIG. 8B is a plan view of FIG. 8A.

As illustrated in FIGS. 8A and 8B, each lateral narrow groove 18 includes the first inclined element 18a, the second inclined element 18b, and a third inclined element 38.

The first inclined element 18a, for example, extends from the circumferential edge 17a with an inclination to approach the adjacent lateral edge 16. The angle θ2 of the first inclined element 18a, for example, is in a range of from 30 to 40 degrees with respect to the tyre axial direction. The axial length L12 of the first inclined element 18a, for example, is in a range of from 0.15 to 0.30 times the axial maximum length L1 of the block 10.

The second inclined element 18b, for example, is inclined in an opposite direction to the first inclined element 18a. The angle θ3 of the second inclined element 18b, for example, is in a range of from 40 to 50 degrees with respect to the tyre axial direction. The axial length L13 of the second inclined element 18b, for example, is in a range of from 0.15 to 0.30 times the axial maximum length L1 of the block 10.

The third inclined element 38, for example, is inclined in an opposite direction to the second inclined element 18b. An angle θ6 of the third inclined element 38, for example, is preferably smaller than the angles θ2 and θ3 of the first inclined element 18a and the second inclined element 18b, respectively. The angle θ6 of third inclined element 38, for example, is in a range of from 5 to 15 degrees with respect to the tyre axial direction. Preferably, an axial length L14 of third inclined element 38, for example, is smaller than the lengths L12 and L13 of the first inclined element 18a and the second inclined element 18b, respectively. Specifically, the length L14 of third inclined element 38 is preferably in a range of from 0.15 to 0.25 times the axial maximum length L1 of the block 10.

Preferably, an angle θ7 between the first inclined element 18a and the second inclined element 18b, for example, is in a range of from 90 to 110 degrees. Preferably, an angle θ8 between the second inclined element 18b and the third inclined element 38 is greater than the angle θ7, and is more preferably in a range of from 120 to 135 degrees.

In FIGS. 8A and 8B, each edge-side portion 23, for example, has a circumferential length increasing from the neck portion 25 toward axially both sides while the circumferential length, in a region between the third inclined element 38 and the adjacent lateral edge 16, decreases toward the tyre equator C.

In FIGS. 8A and 8B, the inner portion 22 has a circumferential length decreasing from the wide portion 27 toward the axially both sides, while the circumferential length, in a region between facing third inclined elements 38, increases toward the tyre equator C. Such a block 10 can suppress damage on axial end portions of the lateral edges 16 located on the tyre equator C side effectively.

Figure 9A:
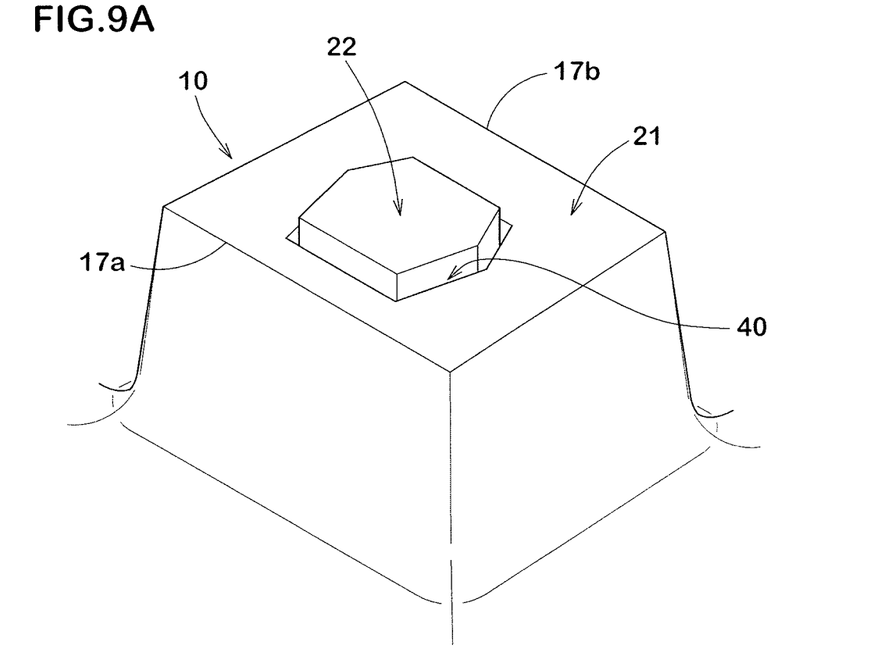
FIG. 9A is a perspective view of a block according to yet another embodiment of the disclosure.
Figure 9B:
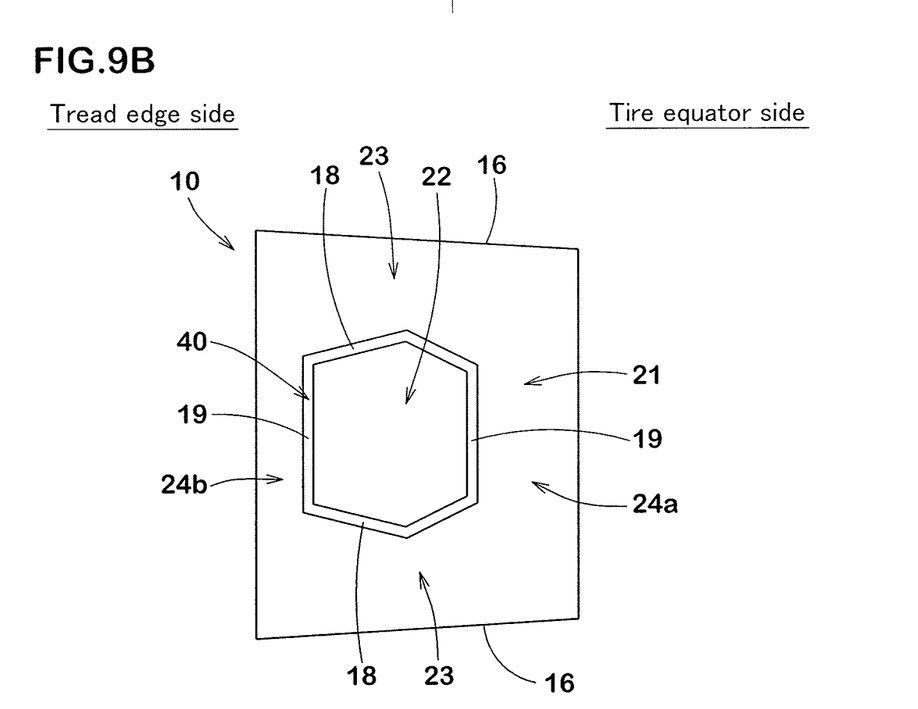
FIG. 9B is a plan view of FIG. 9A.

In FIGS. 9A and 9B, the block 10 includes a closed annular narrow groove 40 which includes the pair of lateral narrow grooves 18, and a pair of longitudinal narrow grooves 19 connecting the pair of lateral narrow grooves 18. The block 10 has a higher rigidity than the block mentioned above, thereby having superior durability.

In FIGS. 9A and 9B, the block 10 includes the inner portion 22 surrounded by the annular narrow groove 40, and the outer portion 21 surrounding the inner portion 22 through the annular narrow groove 40. The outer portion 21 includes the pair of edge-side portions 23, a first connecting portion 24a connecting the pair of edge-side portions 23 at the tyre equator C side, and a second connecting portion 24b connecting the pair of edge-side portions 23 at the tread edge Te side.

Preferably, the first connecting portion 24a, for example, has a larger axial width than that of the second connecting portion 24b. Thus, damage on the lateral edges 16 at the tyre equator C side may be suppressed.

While the particularly preferable embodiments in accordance with the present invention have been described in detail, the present invention is not limited to the illustrated embodiments, but can be modified and carried out in various aspects.

EXAMPLE

Figure 10:
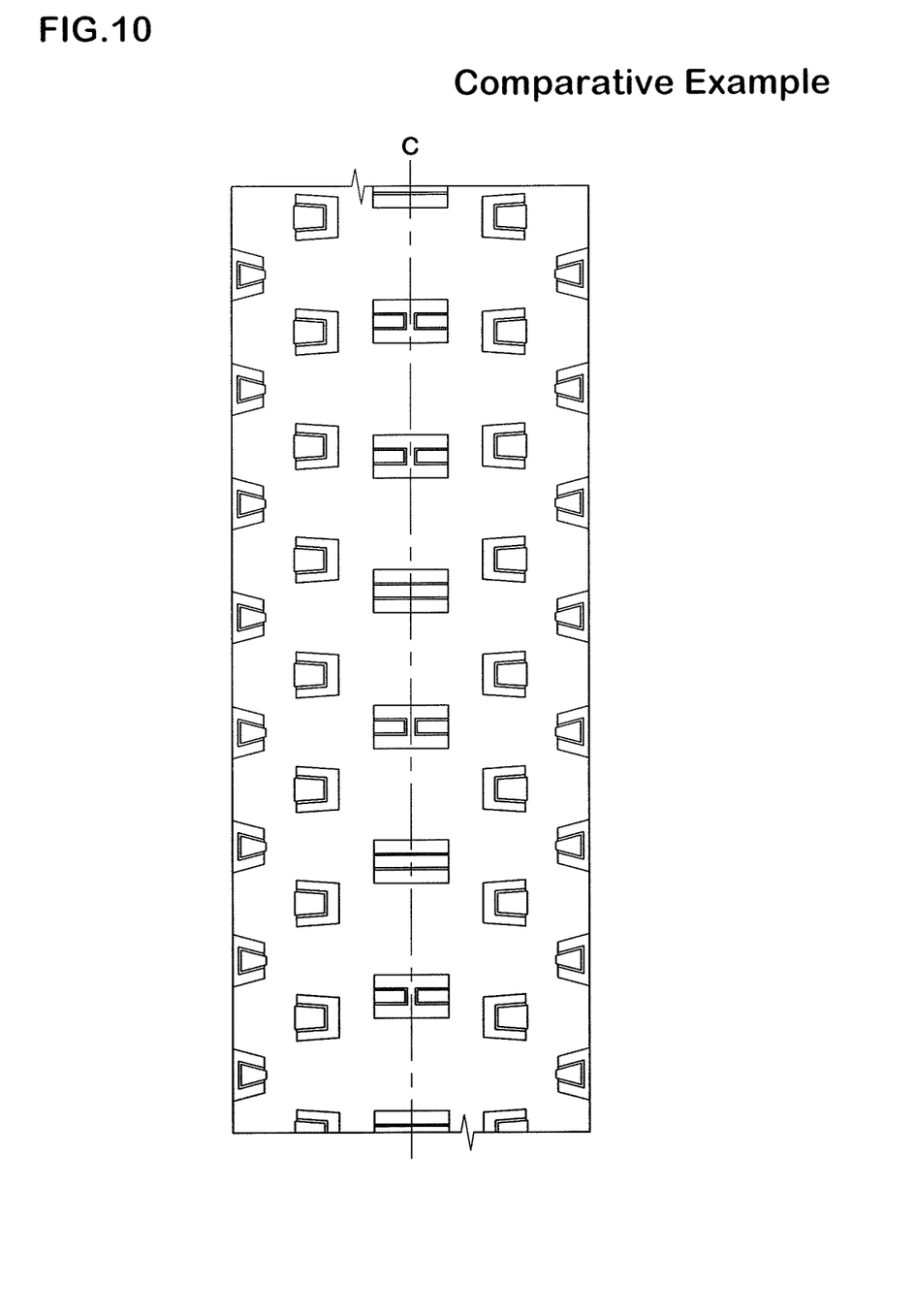
FIG. 10 is a development view of a tread portion of a motorcycle tyre for traveling on rough terrain according to a comparative example.

As the examples, motorcycle tyres for rough terrain for a rear wheel having a basic structure as shown in FIG. 2 with middle blocks shown in FIGS. 4 and 7 to 9 were prototyped based on Table 1. As a comparative example, as illustrated in FIG. 10, a motorcycle tyres having blocks each provided with a pair of edge-side portions having a constant circumferential length over the entire length was prototyped. Then, grip performance and block durability of each test tyre was tested. The common specification of the tyres are as follows:

motorcycle used for test: motocross bike having a 450 cc displacement;

tyre size: 120/80-19;

rim size: 2.15×19;

tyre inner pressure: 80 kPa; and land ratio: 22%.

The test methods are as follows:

Grip Performance Test:

A test rider drove the motorcycle in a motocross course, and evaluated grip performance on straight traveling and cornering by his sense. The test results are shown in Table 1 using a score system based on the comparative example (Ref.) being 100. The larger the value, the better the performance.

Block Rigidity Test:

After the grip performance test, damaged condition on the middle blocks was evaluated by sight. The test results are shown in Table 1 using a score system based on the comparative example (Ref.) being 100. The larger the value, the better the performance.

Table 1 shows the test results.

TABLE 1

|  | Ref. | Ex. 1 | Ex. 2 | Ex. 3 | Ex. 4 | Ex. 5 | Ex. 6 |
|---|---|---|---|---|---|---|---|
| Tread pattern | FIG. 10 | FIG. 2 | FIG. 2 | FIG. 2 | FIG. 2 | FIG. 2 | FIG. 2 |
| Middle block shape | — | FIG. 4 | FIG. 4 | FIG. 4 | FIG. 4 | FIG. 4 | FIG. 4 |

TABLE 1-continued

| | | | | | | | |
|---|---|---|---|---|---|---|---|
| Ratio of average circumferential edge-side portion lengths to block circumferential length L3 | 0.25 | 0.25 | 0.15 | 0.20 | 0.30 | 0.35 | 0.25 |
| Ratio of inner portion axial length L9 to average block axial length | 0.70 | 0.70 | 0.70 | 0.70 | 0.70 | 0.70 | 0.55 |
| Grip performance (score) | 100 | 103 | 104 | 104 | 103 | 101 | 100 |
| Block durability (score) | 100 | 106 | 102 | 104 | 107 | 107 | 107 |

| | Ex. 7 | Ex. 8 | Ex. 9 | Ex. 10 | Ex. 11 | Ex. 12 |
|---|---|---|---|---|---|---|
| Tread pattern | FIG. 2 | FIG. 2 | FIG. 2 | FIG. 2 | FIG. 2 | FIG. 2 |
| Middle block shape | FIG. 4 | FIG. 4 | FIG. 4 | FIG. 7 | FIG. 8 | FIG. 9 |
| Ratio of average circumferential edge-side portion lengths to block circumferential length L3 | 0.25 | 0.25 | 0.25 | 0.25 | 0.25 | 0.25 |
| Ratio of inner portion axial length L9 to average block axial length | 0.6 | 0.75 | 0.80 | 0.70 | 0.70 | 0.70 |
| Grip performance (score) | 102 | 103 | 103 | 102 | 106 | 102 |
| Block durability (score) | 106 | 105 | 104 | 107 | 104 | 108 |

As shown in Table 1, it is confirmed that the example tyres exert a superior block durability as compared with the comparative example tyre. Thus, it is confirmed that motorcycle tyres for traveling on rough terrain according to the disclosure can improve block durability while ensuring grip performance by modifying configurations of the lateral narrow grooves and edge-side portions.

What is claimed is:

1. A motorcycle tyre for traveling on rough terrain, the tyre comprising:
a tread portion being provided with blocks;
at least one of the blocks comprising a ground contact surface having a pair of lateral edges extending in a tyre axial direction, the at least one of the blocks provided with a pair of lateral narrow grooves extending in the tyre axial direction on the ground contact surface to form a pair of edge-side portions defined between the pair of lateral narrow grooves and the pair of lateral edges; and
at least one of the pair of edge-side portions comprising a neck portion having a minimum circumferential length thereof, wherein a circumferential length of the at least one of the pair of edge-side portions increases toward axially both sides from the neck portion,
wherein the ground contact surface has a pair of longitudinal edges connecting the pair of lateral edges, the pair of lateral narrow grooves extends from one of the pair of longitudinal edges and terminating at inner ends thereof located within the ground contact surface, and the ground contact surface is provided with a longitudinal narrow groove connecting the inner ends of the pair of lateral narrow grooves.

2. The motorcycle tyre for traveling on rough terrain according to claim 1, wherein the pair of edge-side portions each have the neck portion, and each circumferential length of the pair of edge-side portions increases axially both sides thereof from the neck portion.

3. The motorcycle tyre for traveling on rough terrain according to claim 1, wherein the pair of lateral edges extends in a straight shape.

4. The motorcycle tyre for traveling on rough terrain according to claim 1, wherein an average circumferential length of the at least one of the pair of edge-side portions represented by a ratio of a ground contact surface area of the at least one of the pair of edge-side portions to an axial maximum length of the at least one of the pair of edge-side portions is in at range of from 0.15 to 0.35 times a circumferential maximum length of the at least one of the blocks.

5. The motorcycle tyre for traveling on rough terrain according to claim 1, wherein the at least one oldie blocks is arranged between a tyre equator and a tread edge, and the pair of lateral narrow grooves extends from one of the pair of longitudinal edges located on the tread edge side.

6. The motorcycle tyre for traveling on rough terrain according to claim 1, wherein
the at least one of the blocks comprises an inner portion surrounded by the pair of lateral narrow grooves and the longitudinal narrow groove, the inner portion comprises a wide portion having a circumferential maximum length, and a circumferential length of the inner portion decreases toward axially both sides from the wide portion.

7. The motorcycle tyre for traveling on rough terrain according to claim 6, wherein an axial maximum length of the inner portion is equal to or more than 0.60 times a block average axial length represented by a ratio of a ground contact surface area of the at least one of the blocks to a circumferential maximum length of the at least one of the blocks.

8. The motorcycle tyre for traveling on rough terrain according to claim 1, wherein the tread portion, on each side of the tyre equator, comprises a tread middle region between a first circumferential line located away from a tyre equator at a distance of 25% of a tread development half-width and a second circumferential line located away from the tyre equator at a distance of 75% of the tread development half-width, and the at least one of the blocks is arranged such that a center of figure of the ground contact surface is located within the tread middle region.

9. The motorcycle tyre for traveling on rough terrain according to claim 2, wherein the pair of lateral edges extends in a straight shape.

10. The motorcycle tyre for traveling on rough terrain according to claim 2, wherein an average circumferential length of the at least one of the pair of edge-side portions represented by a ratio of a ground contact surface area of the at least one of the pair of edge-side portions to an axial maximum length of the at least one of the pair of edge-side portions is in a range of from 0.15 to 035 times a circumferential maximum length of the at least one of the blocks.

11. The motorcycle tyre for traveling on rough terrain according to claim 3, wherein an average circumferential length of the at least one of the pair of edge-side portions represented by a ratio of a ground contact surface area of the at least one of the pair of edge-side portions to an axial maximum length of the at least one of the pair of edge-side portions is in a range of from 0.15 to 0.35 times a circumferential maximum length of the at least one of the blocks.

12. The motorcycle tyre for traveling on rough terrain according to claim 2, wherein the tread portion, on each side of the tyre equator, comprises a tread middle region between a first circumferential line located away from a tyre equator at a distance of 25% of a tread development half-width and a second circumferential line located away from the tyre equator at a distance of 75% of the tread development half-width, and the at least one of the blocks is arranged such that a center of figure of the ground contact surface is located within the tread middle region.

13. The motorcycle tyre for traveling on rough terrain according to claim 3, wherein the tread portion, on each side of the tyre equator, comprises a tread middle region between a first circumferential line located away from a tyre equator at a distance of 25% of a tread development half-width and a second circumferential line located away from the tyre equator at a distance of 75% of the tread development half-width, and the at least one of the blocks is arranged such that a center of figure of the ground contact surface is located within the tread middle region.

14. The motorcycle tyre for traveling on rough terrain according to claim 4, wherein the tread portion, on each side of the tyre equator, comprises a tread middle region between a first circumferential line located away from a tyre equator at a distance of 25% of a tread development half-width and a second circumferential line located away from the tyre equator at a distance of 75% of the tread development half-width, and the at least one of the blocks is arranged such that a center of figure of the ground contact surface is located within the tread middle region.

* * * * *